United States Patent Office 2,759,898
Patented Aug. 21, 1956

2,759,898

METHOD OF FORMING SPHERICAL INORGANIC OXIDE PARTICLES

Reno W. Moehl, Brookfield, Ill., assignor to Universal Oil Products Company, Chicago, Ill., a corporation of Delaware No Drawing. Application October 2, 1952, Serial No. 312,848

7 Claims. (Cl. 252—448)

This invention relates to an improved method of forming spherical inorganic oxide particles and more particularly to a method of preventing the interreaction of the various media used in the formation of these particles.

Spherical inorganic oxide particles are generally formed by dispersing a gelled inorganic oxide sol as small droplets into a medium that accelerates the gellation reaction of the sol and thereafter collecting the formed gel spheroids in a receiving medium that may or may not react with the gel spheroids.

In a preferred method of forming gel spheroids the receiving medium serves a dual purpose. Besides receiving the formed spheroids this medium is frequently used to age the spheroids, retard the aging of the spheroids, or in some other manner to change the physical or chemical characteristics of the spheroids. When the receiving medium is used for a dual purpose it frequently contains a reagent which reacts with the gelling medium thereby destroying or depleting both the gelling medium and the receiving reagent. Even though the receiving medium does not contain an active reagent there is a depletion of the gelling medium caused by the equilibrium solubility effects between the receiving medium and the gelling medium, these effects causing the depletion of the gelling medium, and a change in the receiving medium. It is therefore an object of this invention to separate the various media in a sphere forming process, thereby preventing contact between the media and the consequent depletion or destruction thereof.

In one embodiment of this invention a gaseous gelling medium is separated from a liquid receiving medium by disposing on the surface of the liquid receiving medium a shallow layer of inert, immiscible liquid which forms a shield preventing contact between the gelling medium and the receiving medium.

In another embodiment of this invention a liquid gelling medium is separated from a liquid receiving medium by disposing between the two media a shallow layer of inert, immiscible liquid, thereby shielding the two media from each other and preventing interreaction between the two media.

In a specific embodiment a silica-containing sol is dispersed as small droplets into an atmosphere of ammonia gas and subsequently collected in an aqueous receiving medium which may contain a metal salt or an acid. A thin layer of kerosene, gas oil, gasoline, Nujol, or the like, is disposed on the surface of the aqueous medium, thereby separating this medium from the ammonia and preventing the ammonia from dissolving in or reacting with the aqueous medium.

In another specific embodiment a silica-containing sol is dispersed as droplets into a hot oil medium and subsequently collected in a second medium disposed between the hot oil medium. The second medium may be a heavy oil medium separated from the hot oil medium by a shallow layer of water thereby preventing contact between the two media and preventing interreaction or dissolving of one with the other.

In a preferred method of manufacture a silica sol is dispersed as small droplets in a basic gaseous medium such as ammonia, ethylamine, methylamine, etc., the formed spheres subsequently are collected in an aqueous medium which may be water, acid solutions, such as hydrochloric, sulfuric, acetic, etc., salt solutions such as ammonium sulfate, ammonium carbonate, ammonium bicarbonate, etc., after which the formed spheroids are removed from the receiver and subjected to further processing. It may be seen that when the gelling medium is ammonia and the receiving medium is any of the above mentioned, there will be a depletion of the ammonia supply due to its solubility in the aqueous medium or its interreaction with the various reagents contained therein. A shallow layer of kerosene disposed on the surface of the aqueous medium prevents the above mentioned difficulties in that the solubility of the ammonia in kerosene is very small and the solubility of water or the reagents dissolved therein is also very small. It may therefore be seen that the shallow layer of kerosene is an effective shield against interaction between the two media and has no other effect on the process inasmuch as the spheres easily pass through the kerosene and the kerosene-water interface without being affected in any manner.

In the case of a liquid gelling medium a preferred method of manufacture is to dissolve in the liquid gelling medium a reagent that will accelerate the gellation reaction of the sol disposed therein. In order to prevent excessive gellation, the gel spheroids must be removed from the liquid gelling medium before too long a time has elapsed. This is generally done by causing the gel spheroids to pass through an interface and into a second medium that has no gelling activity, and collecting the spheroids in the second medium. It is within the scope of this invention to use hydrocarbon substances for both the gelling medium and the collecting medium and to separate the two media with a layer of water. It is necessary that the collecting medium have a specific gravity greater than 1.0 and that the gelling medium have a specific gravity less than 1.0 if an effective separation is to be made. In a preferred operation the collecting medium will circulate to provide a means of removing spheroids from the receiver, however, a level of receiving liquid will always be maintained beneath the gelling medium.

As a specific example of the invention, a silica sol is dispersed into an atmosphere of ammonia gas, the resultant gel spheroids subsequently collected in an aqueous solution of aluminum sulfate, and contact between the ammonia gas and the sulfate solution prevented by disposing a layer of kerosene on said solution.

The method of the present invention is suitable for the manufacture of spherical particles from any gellable hydrous inorganic oxide sol. Some of these may include sols of silica, alumina, magnesia, zirconia, thoria, etc., and any mixtures thereof. The composites thus produced may be used as catalysts or catalyst bases for (1) cracking operations wherein hydrocarbon molecules are broken down to form lighter hydrocarbon molecules, (2) processes known as reforming, isoforming, retreating, etc., (3) hydrogen transfer reactions, (4) alkyl transfer reactions as for example, reaction of benzene and xylene to form toluene, (5) polymerizing processes wherein light hydrocarbons are polymerized to heavier hydrocarbons, (6) treating of hydrocarbons, as for example, desulfurization of gasoline, and many others. Particles prepared by the method of this invention also be used as dessicants and adsorbants.

I claim as my invention:

1. In the method of manufacturing spherical inorganic oxide particles by dispersing a gellable inorganic oxide sol into a basic gelling medium and subsequently collecting the resulting gel spheroids in an acidic liquid receiving medium, the improvement which comprises preventing contact between said gelling medium and said liquid receiving medium by disposing on said liquid receiving medium a liquid which is inert with respect to and immiscible with said mediums.

2. The method of claim 1 further characterized in that said gelling medium is a gas.

3. The method of claim 1 further characterized in that said gelling medium is ammonia gas.

4. The method of claim 1 further characterized in that said gelling medium is a liquid.

5. The method of claim 1 further characterized in that said acidic receiving medium is an aqueous solution of a metal salt.

6. The method of claim 1 further characterized in that said inert, immiscible liquid comprises hydrocarbon with a specific gravity less than 1.0.

7. In the method of manufacturing inorganic oxide spheroids by dispersing a silica containing sol into an ammonia gas atmosphere and subsequently collecting the resulting gel spheriods in an aqueous solution of aluminum sulfate, the improvement which comprises preventing contact between said ammonia gas and said aluminum sulfate solution by disposing a layer of kerosene on said aluminum sulfate solution.

References Cited in the file of this patent

UNITED STATES PATENTS

| | | |
|---|---|---|
| 2,450,394 | Brown et al. | Sept. 28, 1948 |
| 2,471,000 | Messenger | May 24, 1949 |
| 2,471,986 | Waddill | May 31, 1949 |
| 2,652,371 | Gring | Sept. 15, 1953 |